(12) United States Patent
Stirniman et al.

(10) Patent No.: US 8,382,902 B2
(45) Date of Patent: Feb. 26, 2013

(54) SINGLE DISC VAPOR LUBRICATION

(75) Inventors: Michael Joseph Stirniman, Fremont, CA (US); Paul Stephen McLeod, Berkeley, CA (US)

(73) Assignee: Seagate Technology LLC

( * ) Notice: Subject to any disclaimer, the term of this patent is extended or adjusted under 35 U.S.C. 154(b) by 781 days.

(21) Appl. No.: 10/644,054

(22) Filed: Aug. 20, 2003

(65) Prior Publication Data

US 2004/0112291 A1 Jun. 17, 2004

Related U.S. Application Data

(63) Continuation-in-part of application No. 09/798,934, filed on Mar. 6, 2001, now Pat. No. 6,613,151.

(60) Provisional application No. 60/196,759, filed on Apr. 12, 2000.

(51) Int. Cl.
*C23C 16/00* (2006.01)

(52) U.S. Cl. ... 118/726; 118/718; 118/719; 156/345.18; 156/345.37

(58) Field of Classification Search .................. 118/718, 118/726, 715, 719; 156/345.18, 345.37
See application file for complete search history.

(56) References Cited

U.S. PATENT DOCUMENTS

| | | | |
|---|---|---|---|
| 4,642,246 A | 2/1987 | Janssen et al. | |
| 4,713,287 A | 12/1987 | Nishikawa et al. | |
| 4,789,913 A | 12/1988 | Gregory et al. | |
| 4,868,009 A | 9/1989 | Stefanini | 118/503 |
| 4,894,133 A * | 1/1990 | Hedgcoth | 204/192.15 |
| 5,167,096 A * | 12/1992 | Eltoukhy et al. | 451/59 |
| 5,196,064 A * | 3/1993 | Branderhorst et al. | 118/313 |
| 5,215,420 A | 6/1993 | Hughes et al. | |
| 5,244,554 A * | 9/1993 | Yamagata et al. | 204/192.2 |
| 5,268,033 A | 12/1993 | Stewart | 118/715 |
| 5,279,877 A | 1/1994 | Uchiyama et al. | |
| 5,562,965 A | 10/1996 | Gui et al. | |
| 5,626,970 A * | 5/1997 | Hedgcoth | 428/611 |
| 5,633,089 A | 5/1997 | Kondo | |
| 5,698,272 A | 12/1997 | Smentkowski et al. | |
| 5,756,198 A | 5/1998 | Tanaka | |
| 5,803,976 A * | 9/1998 | Baxter et al. | 118/726 |
| 5,830,327 A * | 11/1998 | Kolenkow | 204/192.12 |
| 5,858,536 A | 1/1999 | Yanagisawa | |
| 5,882,415 A * | 3/1999 | Helling et al. | 118/723 EB |
| 5,900,065 A * | 5/1999 | Liehr et al. | 118/723 HC |
| 5,904,958 A | 5/1999 | Dick et al. | 118/719 |
| 5,922,415 A | 7/1999 | Dearnaley et al. | |
| 6,031,685 A | 2/2000 | French et al. | |
| 6,036,824 A * | 3/2000 | Hedgcoth | 204/192.16 |
| 6,096,385 A | 8/2000 | Yong et al. | |
| 6,183,831 B1 | 2/2001 | Hughes et al. | |
| 6,214,410 B1 | 4/2001 | Stirniman et al. | |
| 6,235,634 B1 | 5/2001 | White et al. | 118/715 |
| 6,241,824 B1 | 6/2001 | Brauer et al. | 118/500 |
| 6,340,501 B1 | 1/2002 | Kamiyama et al. | 118/715 |
| 6,355,300 B1 | 3/2002 | Stirniman et al. | |
| 6,478,876 B1 * | 11/2002 | Asamoto | 118/726 |
| 6,487,986 B1 * | 12/2002 | Liehr et al. | 118/723 MW |
| 6,497,799 B1 * | 12/2002 | McLeod | 204/192.2 |
| 6,511,702 B1 | 1/2003 | Stirniman et al. | |
| 6,517,691 B1 | 2/2003 | Bluck et al. | |
| 6,613,151 B1 * | 9/2003 | Stirniman et al. | 118/726 |

(Continued)

FOREIGN PATENT DOCUMENTS

| EP | 318071 A * | 5/1989 | |
|---|---|---|---|
| WO | WO 9904909 A1 | 2/1999 | 118/720 |

*Primary Examiner* — Sylvia R. MacArthur

(57) ABSTRACT

Apparatus and method for vapor deposition of a uniform thickness thin film of lubricant on at least one surface of a disk-shaped substrate. The invention has particular utility in depositing thin films of polymeric lubricants onto disc-shaped substrates in the manufacture of magnetic and MO recording media.

17 Claims, 2 Drawing Sheets

U.S. PATENT DOCUMENTS

| | | | |
|---|---|---|---|
| 6,749,906 B2* | 6/2004 | Van Slyke | 427/591 |
| 6,808,741 B1 | 10/2004 | McLeod | |
| 6,919,001 B2 | 7/2005 | Fairbairn et al. | |
| 7,146,710 B2 | 12/2006 | Fong et al. | |
| 7,361,380 B1 | 4/2008 | Liu et al. | |
| 2002/0179013 A1* | 12/2002 | Kido et al. | 118/718 |
| 2005/0016461 A1* | 1/2005 | Klug et al. | 118/726 |
| 2005/0016463 A1* | 1/2005 | Hirano | 118/726 |
| 2005/0022743 A1* | 2/2005 | Sakata et al. | 118/726 |
| 2008/0236481 A1 | 10/2008 | Petersen et al. | |
| 2008/0241366 A1 | 10/2008 | Petersen et al. | |
| 2008/0241367 A1 | 10/2008 | Petersen et al. | |

* cited by examiner

SINGLE DISC VAPOR LUBRICATION

CROSS-REFERENCE TO RELATED APPLICATIONS

This application is a Continuation-In-Part of U.S. patent application Ser. No. 09/798,934, filed Mar. 6, 2001 now U.S. Pat. No. 6,613,151, which claims priority from U.S. provisional patent application Ser. No. 60/196,759 filed Apr. 12, 2000, the entire disclosures of which are incorporated herein by reference.

FIELD OF THE INVENTION

The present invention relates to an apparatus and method for uniformly applying a thin film of a lubricant to the substrate surfaces in a solventless manner. The invention has particular utility in the manufacture of magnetic or magneto-optical ("MO") data/information storage and retrieval media comprising a layer stack or laminate of a plurality of layers formed on a suitable substrate, e.g., a disc-shaped substrate, wherein a thin lubricant topcoat is applied to the upper surface of the layer stack or laminate for improving tribological performance of the media when utilized with read/write transducers operating at very low flying heights.

BACKGROUND OF THE INVENTION

Magnetic and MO media are widely employed in various applications, particularly in the computer industry for data/information storage and retrieval purposes. A magnetic medium in e.g., disc form, such as utilized in computer-related applications, comprises a non-magnetic disc-shaped substrate, e.g., of glass, ceramic, glass-ceramic composite, polymer, metal, or metal alloy, typically an aluminum (Al)-based alloy such as aluminum-magnesium (Al—Mg), having at least one major surface on which a layer stack or laminate comprising a plurality of thin film layers constituting the medium are sequentially deposited. Such layers may include, in sequence from the substrate deposition surface, a plating layer, e.g., of amorphous nickel-phosphorus (Ni—P), a polycrystalline underlayer, typically of chromium (Cr) or a Cr-based alloy such as chromium-vanadium (Cr—V), a magnetic layer, e.g., of a cobalt (Co)-based alloy, and a protective overcoat layer, typically of a carbon (C)-based material having good tribological properties. A similar situation exists with MO media, wherein a layer stack or laminate is formed on a substrate deposition surface, which layer stack or laminate comprises a reflective layer, typically of a metal or metal alloy, one or more rare-earth thermo-magnetic (RE-TM) alloy layers, one or more transparent dielectric layers, and a protective overcoat layer, for functioning as reflective, transparent, writing, writing assist, and read-out layers, etc.

Thin film magnetic and MO media in disc form, such as described supra, are typically lubricated with a thin film of a polymeric lubricant, e.g., a perfluoropolyether, to reduce wear of the disc when utilized with data/information recording and read-out heads/transducers operating at low flying heights, as in a hard disk system functioning in a contact start-stop ("CSS") mode. Conventionally, a thin film of lubricant is applied to the disc surface(s) during manufacture by dipping into a bath containing a small amount of lubricant, e.g., less than about 1% by weight of a fluorine-containing polymer, dissolved in a suitable solvent, typically a perfluorocarbon, fluorohydrocarbon, or hydrofluoroether. However, a drawback inherent in such dipping process is the consumption of large quantities of solvent, resulting in increased manufacturing cost and concern with environmental hazards associated with the presence of toxic or otherwise potentially harmful solvent vapors in the workplace.

Another drawback associated with the conventional dipping method for applying a thin film of a polymeric lubricant to a substrate results from the lubricant materials being mixtures of long chain polymers, with a distribution of molecular weights. Since the molecular weight of the polymeric lubricant affects the mechanical (i.e., tribological) performance of the head-disc interface, it is common practice to subject the polymeric lubricant mixtures (as supplied by the manufacturer) to a fractionation process prior to adding the lubricant to the solvent in order to obtain a fraction having a desired molecular weight distribution providing optimal tribological performance. However, such pre-fractionation undesirably adds an additional step and increases the overall process cost.

Vapor deposition of thin film lubricants is an attractive alternative to dip lubrication in view of the above drawbacks. Specifically, vapor deposition of lubricant films is advantageous in that it is a solventless process and the process for generating the lubricant vapor can simultaneously serve for fractionating the lubricant mixture into a desired molecular weight distribution, thereby eliminating the need for a pre-fractionation step. Moreover, vapor deposition techniques can provide up to about 100% bonded lubricant molecules when utilized with appropriate polymeric lubricants and magnetic and/or MO disc substrates having deposition surfaces comprised of a freshly-deposited carbon-based protective overcoat layer.

However, existing vapor deposition apparatus (e.g., Intevac VLS 100, Intevac Corp., Santa Clara, Calif.) for applying a thin layer of polymeric lubricant to a thin film data/information storage and retrieval medium, e.g., in disc form, utilize a static process/system, wherein a disc-shaped substrate is moved to a position facing the front (i.e., orifice) of a source of lubricant vapor (e.g., by means of a disc lifter) and statically maintained at that position while the lubricant film is deposited on the entire disc surface, with the lubricant film thickness being determined (i.e., controlled) by the length of the interval during which the disc surface is statically maintained facing the orifice(s) of the lubricant vapor source.

In order to control the spatial distribution, hence thickness uniformity, of the lubricant thin films obtained with such static vapor deposition process/apparatus at deposition rates of from about 1 to about 10 Å/sec. for providing lubricant film thicknesses up to about 50 Å, a diffuser plate for the lubricant vapor is provided intermediate the lubricant vapor source and the substrate surface, thereby adding to the system complexity and necessitating periodic maintenance of the diffuser plate for ensuring clear vapor passage through each of the openings in the diffuser plate. In addition, such static vapor lubrication systems incur a drawback when utilized as part of an in-line or similar type multi-chamber or modular system for manufacturing magnetic or MO media, in that a line-of-sight path is required for the mechanism utilized for positioning the disk surface opposite the lubricant vapor source. As a result, a path can be established for the lubricant vapor to escape from the lubricant deposition chamber into adjacent process chambers utilized for different processing functions and result in their being contaminated with lubricant vapor.

Notwithstanding the improvement in spatial uniformity of lubricant film thickness afforded by the use of a diffuser plate or similar element between the lubricant vapor source and the disk substrate surface, current vapor deposition processes for applying thin films of lubricant or other additive to substrate surfaces result in some degree of film thickness non-uniformity. It is believed that such spatial non-uniformity has dual origins, as follows:

(1) although the above-described system is nominally static, the substrate (e.g., a disc) is necessarily in motion during its placement facing the lubricant vapor source and during its removal therefrom, which motion creates a non-uniformity, i.e., a thickness gradient, across the disc surface in the direction of the motion. The extent and magnitude of the gradient is a function of the deposition rate and the speed of the mechanism utilized for placement of the disc in facing relation to the lubricant vapor source and removal therefrom; and (2) because of the large substrate size (i.e., disc diameter) and physical constraints on apparatus dimensions, multiple lubricant vapor sources and/or vapor diffuser plates generally are necessary for obtaining thickness uniformity over the entire substrate surface. However, even in the best cases wherein multiple lubricant vapor sources and/or vapor diffuser plates are utilized, regions of greater and lesser lubricant or additive thickness are routinely obtained.

In view of the above, there exists a clear need for improved means and methodology for depositing thin films of a lubricant, e.g., a polymeric lubricant, by vapor techniques and at deposition rates consistent with the throughput requirements of automated manufacturing processing, e.g., of magnetic and/or MO data/information storage and retrieval media, which means and methodology overcome the above-described drawbacks and disadvantages of the conventional static lubricant vapor deposition technology. More specifically, there exists a need for improved means and methodology for vapor depositing thin films of lubricant (e.g., a polymeric lubricant) which provides improved lubricant film thickness uniformity over the entire deposition area of disc-shaped substrates utilized in the manufacture of such magnetic and/or MO media.

The present invention addresses and solves problems and difficulties in achieving uniform thickness lubricant thin film deposition over large area substrates by means of vapor deposition techniques, e.g., thin film polymeric lubricant deposition on disc-shaped substrates utilized in the manufacture of magnetic and/or MO media, while maintaining full capability with all aspects of conventional automated manufacturing technology therefor. Further, the means and methodology afforded by the present invention enjoy diverse utility in the manufacture of various other devices and articles requiring deposition of uniform thickness thin film lubricant layers thereon.

DISCLOSURE OF THE INVENTION

An advantage of the present invention is an improved apparatus for vapor depositing a uniform thickness thin film of a lubricant on at least one surface of a disk-shaped substrate.

Another advantage of the present invention is an improved apparatus for vapor depositing a uniform thickness thin film of a lubricant on at least one surface of a disc-shaped substrate, e.g., as part of a process/system for manufacturing magnetic and/or MO data/information storage and retrieval media.

Yet another advantage of the present invention is an improved method for vapor depositing a uniform thickness thin film of a lubricant on at least one surface of a disk-shaped substrate.

Still another advantage of the present invention is an improved method for vapor depositing a uniform thickness thin film of a lubricant topcoat on at least one surface of a disc-shaped substrate utilized in the manufacture of magnetic and/or MO recording media.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an apparatus for vapor depositing a uniform thickness thin film of a lubricant on at least one surface of a substrate, comprising:

(a) a chamber having an interior space;
(b) a substrate loader/unloader for supplying said interior space with at least one disk-shaped substrate and for withdrawing at least one disk-shaped substrate from said interior space, said disk-shaped substrate comprising a magnetic or magneto optical data/information storage and retrieval medium;
(c) at least one lubricant vapor source for supplying said interior space with a stream of lubricant vapor, said vapor source comprising a closed heated chamber fluidly communicating with at least a plurality of primary plugs for supplying a stream of lubricant vapor; and
(d) a substrate transporter/conveyor for continuously moving at least one disk-shaped substrate past said stream of lubricant vapor from said at least one lubricant vapor source for depositing on at least one surface thereof a uniform thickness thin film of lubricant.

Another aspect of the present invention is a method of vapor depositing a uniform thickness thin film of lubricant on at least one surface of a substrate, comprising the steps of:

(a) providing an apparatus comprising:
  (i) a chamber having an interior space maintained below atmospheric pressure;
  (ii) a substrate loader/unloader for supplying said interior space with at least one disk-shaped substrate and for withdrawing at least one disk-shaped substrate from said interior space, said disk-shaped substrate comprising a magnetic or magneto optical data/information storage and retrieval medium;
  (iii) at least one lubricant vapor source for supplying said interior space with a stream of lubricant vapor, said vapor source comprising a closed heated chamber fluidly communicating with at least a plurality of primary plugs for supplying a stream of lubricant vapor; and
  (iv) a substrate transporter/conveyor for continuously moving at least one substrate past said stream of vapor from said at least one lubricant vapor source;
(b) supplying said interior space with a substrate having at least one surface;
(c) continuously moving said substrate past said stream of lubricant vapor and depositing a uniform thickness thin film of said lubricant on said at least one surface; and
(d) withdrawing the lubricant-coated disk-shaped substrate from said interior space.

Additional advantages and aspects of the present invention will become readily apparent to those skilled in the art from the following detailed description, wherein embodiments of the present invention are shown and described, simply by illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, in which like reference numerals are employed throughout to designate similar features, wherein.

DESCRIPTION OF THE INVENTION

Figure 1:
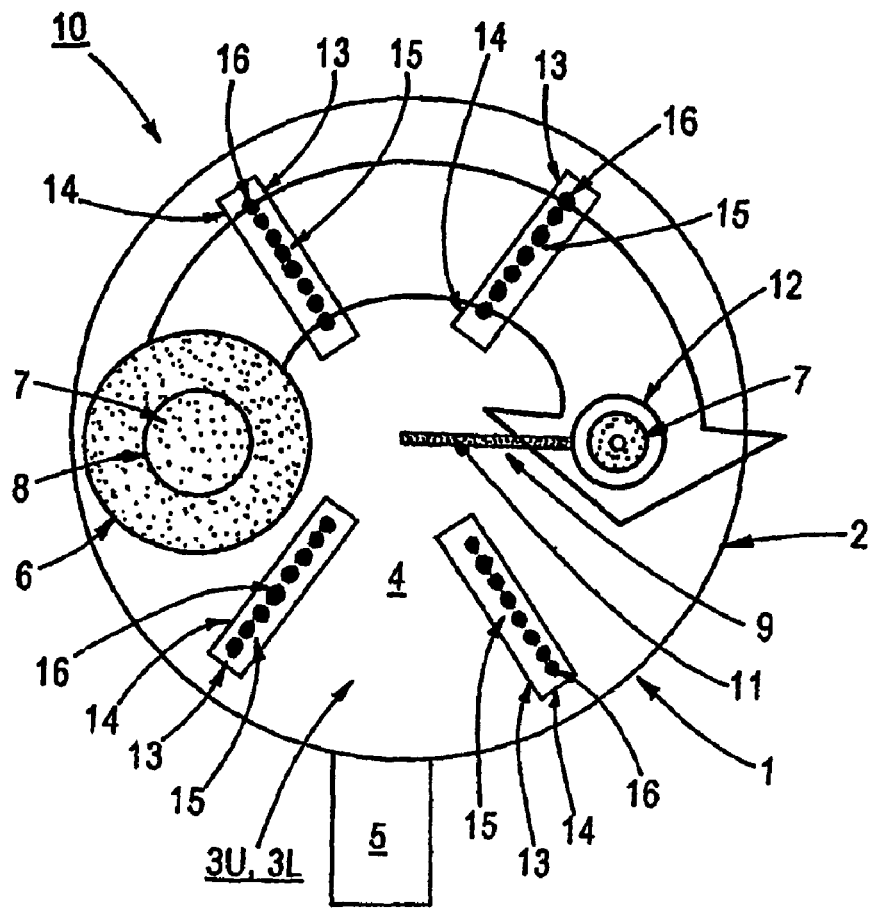
FIG. 1 is a schematic view of an embodiment of a lubricant vapor deposition apparatus according to the present invention.

The present invention is based upon recognition that the above-described limitations/drawbacks related to poor thickness uniformity of the deposited lubricant thin films associated with conventional lubricant vapor deposition processing, e.g., as utilized in the manufacture of disc-shaped magnetic and MO recording media, arising from: (1) the use of static vapor deposition means and methodology; and (2) the large substrate sizes and consequent requirement for use of multiple lubricant vapor sources and/or vapor diffuser plate, can be avoided, or at least minimized, by use of "pass-by" lubricant vapor deposition apparatus and methodology, wherein the substrates are continuously moved past the lubricant vapor source(s) for lubricant thin film deposition on the surface(s) thereof. As a consequence, non-uniformity of the lubricant thin film thickness arising from the static positioning of the substrates relative to the lubricant vapor source is eliminated, or at least minimized.

In addition, according to the present invention, thickness uniformity of the lubricant thin films is enhanced by providing the lubricant vapor source(s) in elongated form of length greater than the maximum dimension of the substrate deposition surface, e.g., disc diameter, with a plurality of removable threaded plugs for providing an even distribution of lubricant vapor. The lubricant vapor source(s) comprises at least a plurality of threaded holes into which the plugs are inserted therein. Each of the plugs comprises a drilled hole which extends substantially the length of the plug's interior. Moreover, the drilled hole of each plug can have substantially the same or different diameter from the other plugs. In certain embodiments, a vapor flow profile can be established by varying sizes of the drilled hole in each plug to guarantee an even distribution of lubricant vapor. The larger diameter drilled holes will have a faster rate of vapor deposition than a smaller drilled hole. As an example, smaller holes can be positioned at the outer edges of the lubricant vapor source, with larger holes positioned towards the middle of the lubricant vapor source. Such positioning helps prevent any potential buildup of vapor deposition near the edges of the disk-shaped substrate, and thereby ensures an even distribution of lubricant vapor on each side of the disk-shaped substrate. The plugs can be formed into a pattern such as a linear array, a diagonal array, or a rectangular array. However, any pattern is suitable as long as the lubricant thickness uniformity is maintained. The threaded design of the plugs facilitates the replacement of the plugs into the threaded holes of the lubricant vapor source.

The apparatus and methodology of the present invention provide uniform thickness lubricant thin films by vapor deposition at rates consistent with the requirements of automated manufacturing processing, while retaining the advantages of vapor deposition of lubricants, including, inter alia, solventless processing, elimination of pre-fractionation of polymeric lubricant materials, and obtainment of very high percentages of bonded lubricant when utilized with recording media with carbon-based protective overcoats. Moreover, the inventive apparatus is or can be fabricated in modular form and thus fully compatible with existing modular type in-line or sequential processing type apparatus utilized for commercial scale manufacturing operations, e.g., for magnetic and/or MO recording media.

According to the invention, a modular lubricant thin film or additive vapor deposition system utilizes a "pass-by" deposition method, as opposed to the conventional "static" method. The material to be deposited (e.g., lubricant or additive) is contained in a closed, elongated heated chamber having a length greater than the substrate maximum dimension, and allowed to expand through a plurality of plugs, into a deposition chamber maintained at a reduced pressure, e.g., from about $10^{-5}$ to about $10^{-9}$ Torr by a vacuum pump means. Substrates, e.g., discs, carried by a transport or conveyor mechanism are passed in front of and in close proximity to the plugs. The substrates are "passed-by" the plugs in a continuous motion, i.e., without stopping to provide a static interval over the lubricant vapor source as in conventional processing, thereby eliminating both of the above-mentioned sources of lubricant thickness non-uniformity inherent in the static deposition system. According to the invention, the deposition rate of the lubricant or additive can be readily controlled by appropriate variation of any combination of "pass-by" speed, lubricant vapor pressure, and diameter of the drilled hole in the plug, such that a desired lubricant or additive film thickness is obtained during one (1) or more passes by one (1) or more lubricant vapor sources.

According to embodiments of the invention, a secondary set of plugs, which may be cooled, for providing increased collimation of the vapor stream emanating from the lubricant vapor sources. When vapor deposition of both sides of a dual-surfaced substrate is required, e.g., as with disc-shaped substrates, the apparatus may be provided with first and second, similarly configured, opposingly positioned lubricant vapor sources, with the secondary set of plugs being offset from those of the first set. In addition, cooled surfaces may be provided within the deposition chamber for condensing excess vaporized lubricant or additive for preventing contamination thereof, and the inlet and outlet openings (e.g., load lock chambers) to the deposition chamber may be equipped with cold traps and configured as to eliminate any line-of-sight path for escape of lubricant or additive vapor from the deposition chamber into adjoining process chambers.

Referring now to FIG. 1, shown therein, in schematic form, is a cylindrically configured embodiment of a "pass-by" vapor deposition apparatus 10 according to the present invention, wherein substrates are transported in a circular path past at least one elongated, radially extending vapor deposition source positioned transversely with respect to the substrate path. More specifically, apparatus 10 comprises a cylindrically-shaped deposition chamber 1 comprising a curved sidewall portion 2 and upper and lower circularly-shaped end walls 3U, 3L defining an interior space 4, and a vacuum pump 5 or equivalent means for maintaining the interior space 4 at a reduced pressure below atmospheric pressure, e.g., from about $10^{-5}$ to about $10^{-9}$ Torr. A combined substrate load/unload station 6 or equivalent means (either being of conventional design) is provided on one of the upper or lower end walls 3U or 3L for insertion of fresh substrates 7 into the interior space 4 of deposition chamber 1 for vapor deposition onto at least one surface thereof and for removal of vapor-deposited substrates from interior space 4. By way of illustration, substrates 7 may be in the form of annular discs, with inner and outer diameters corresponding to those of conventional disc-type magnetic and/or MO media. The substrate load/unload station 6 or equivalent means may, if desired or necessary, be equipped with a cold trap 8 or equivalently performing means for eliminating any line-of-sight path for escape of lubricant vapor from the lubricant deposition chamber 1 (or module) into adjacent processing modules of an in-line manufacturing system, which cold trap 8 is concentric with the substrate load/unload station 6 when the latter is adapted for use with disc-shaped substrates 7.

Chamber 1 is further provided with a substrate transporter/conveyor means 9, illustratively a radially extending arm 11 controllably rotatable about an axis coaxial with the central axis of the upper and lower end walls 3U and 3L and equipped at the remote end thereof with a substrate support means 12, illustratively a disc gripper or equivalent means, for sequentially transporting/conveying a fresh substrate 7 introduced into the interior space 4 of chamber 1 via substrate load/unload station 6 past at least one, preferably a plurality of elongated, spaced-apart, radially extending lubricant/additive vapor sources 13 for "pass-by" vapor deposition onto at least a first surface of the moving substrate 7. Coated substrates 7 are withdrawn from chamber 1 via substrate load/unload station 6 after "pass-by" deposition thereon from at least one vapor source 13.

Each lubricant/additive vapor source 13 is comprised of a closed, heated, elongated chamber 14 for accommodating therein a quantity of liquid lubricant or additive to be thermally vaporized, chamber 14 having a length greater than the maximum dimension of the substrate deposition surface 7', i.e., the disc diameter in the illustrated example, the wall 15 of the chamber 14 facing the substrate deposition surface 7' being provided with a plurality of plugs 16 for creating a vapor stream directed toward the first surface 7' of substrate 7 for condensation thereon as a thin film. Collimation of the vapor stream may be improved, if necessary, by providing a plurality of secondary plugs (not shown in the drawing for illustrative simplicity), which secondary plugs may be cooled in order to function as a pump for condensing low vapor pressure lubricant, thereby facilitating formation of a well-defined molecular beam of lubricant. In the event the second, opposite surface of the substrate 7 is to receive a vapor deposited lubricant or additive layer, chamber 1 is provided in like manner with at least one similarly constituted vapor source 13 with a plurality of plugs 16 facing the second surface. In such instance, the plugs 16 of the vapor sources 13 on opposite sides of the substrate 7 may be offset, if necessary, and a cooled surface provided opposite the plugs for condensation of excess lubricant or additive vapor, in order to prevent contamination of deposition chamber 1.

In operation of the cylindrically-configured vapor deposition apparatus 10 of FIG. 1, the substrates 7 may be rotated one or more times past one or more vapor sources 13 for deposition of a single or multiple lubricant or additive layers thereon. Provision of multiple vapor sources 13 within chamber 1 increases product throughput and facilitates use of apparatus 10 in modular form as one component of a multi-station, continuous manufacturing line. Deposition thickness, e.g., lubricant layer thickness, may be easily regulated by control of any combination of lubricant vapor pressure, diameter of the plug's drilled hole, and pass-by speed.

Figure 2:
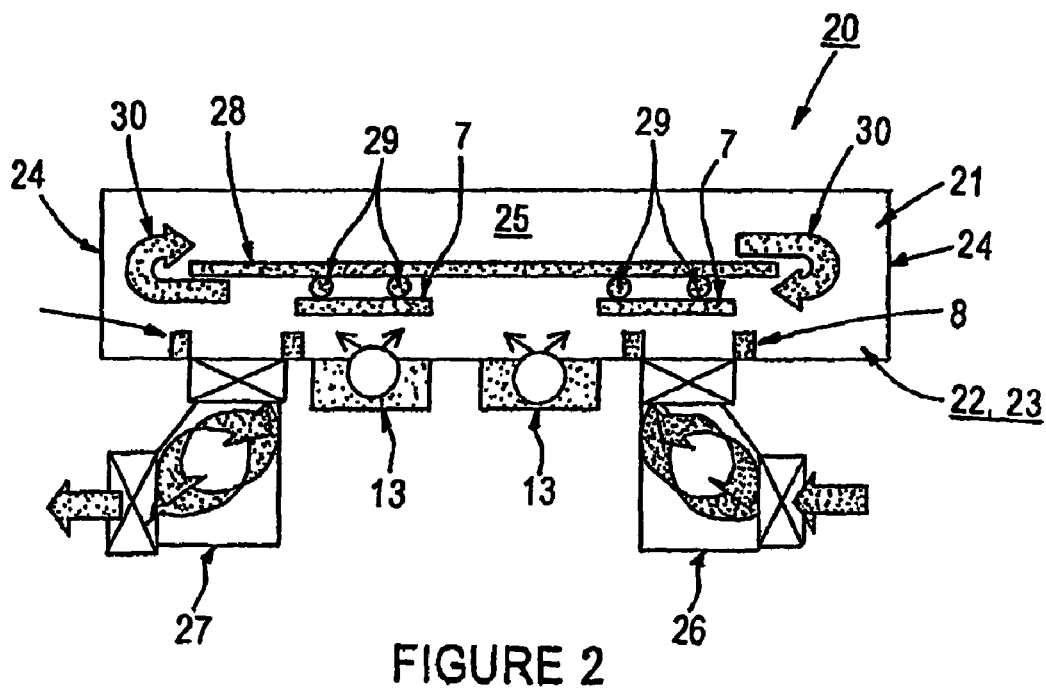
FIG. 2 is a schematic view of another embodiment of a lubricant vapor deposition apparatus according to the present invention.

Referring now to FIG. 2, shown therein, in schematic form, is another embodiment of a "pass-by" vapor deposition apparatus 20 of the present invention in the form of rectangular box-shaped configuration, wherein substrates are transported in a linear path past at least one elongated vapor deposition source positioned transversely with respect to the substrate path. More specifically, apparatus 20 comprises a rectangular box-shaped deposition chamber 21 comprising a front wall 22 and a rear wall 23 connected at their respective ends by side walls 24, the chamber 21 defining an interior space 25 and provided with a vacuum pump or equivalent means (not shown in the drawing for illustrative simplicity) for maintaining the interior space 25 at a reduced pressure below atmospheric pressure, e.g., from about $10^{-5}$ to about $10^{-9}$ Torr. Substrate load lock and exit lock stations 26, 27 or equivalent means are provided at opposite ends of one of the chamber walls, illustratively the front wall 22, for insertion of fresh substrates 7 into the interior space 25 of the deposition chamber 21 at one end thereof, and for removal of coated substrates 7 at the other end. As in the previous embodiment, substrates 7 may, for example, as in the previous embodiment, be in the form of annular discs with inner and outer diameters corresponding to those of conventional disc-type magnetic and/or MO media. Also as before, each of the substrate load lock and exit lock stations 26, 27 may be equipped with a cold trap 8 or equivalently performing means for eliminating any line-of-sight path for escape of lubricant or additive vapor into adjacent process chambers of an modular in-line system.

Deposition chamber 21 is further provided with a substrate transporter/conveyor means 28 comprising a linear transport system equipped with substrate holding/gripping means 29 for sequentially moving substrates 7 past one or more (illustratively two) elongated, transversely extending lubricant/additive vapor sources 13, such as described above with respect to the embodiment of FIG. 1, mounted on at least one of the front or rear chamber walls, illustratively the front wall 22.

In operation of the linearly-configured device of FIG. 2, fresh substrates 7 introduced into the deposition chamber 21 via load lock station 26 move past the at least one vapor source 13 in the direction of arrows 30 one or more times for deposition of a single or multiple layers of lubricant or additive before being removed from chamber 21 via exit lock station 27. As before, provision of multiple vapor sources 13 within the deposition chamber 21 increases product throughput and facilitates use of the apparatus in modular form as one component of a multi-module manufacturing line. Deposition thickness is again easily regulated by appropriate control of any desired combination of vapor pressure, the diameter of the plug's drilled hole, and pass-by speed.

Figure 3:
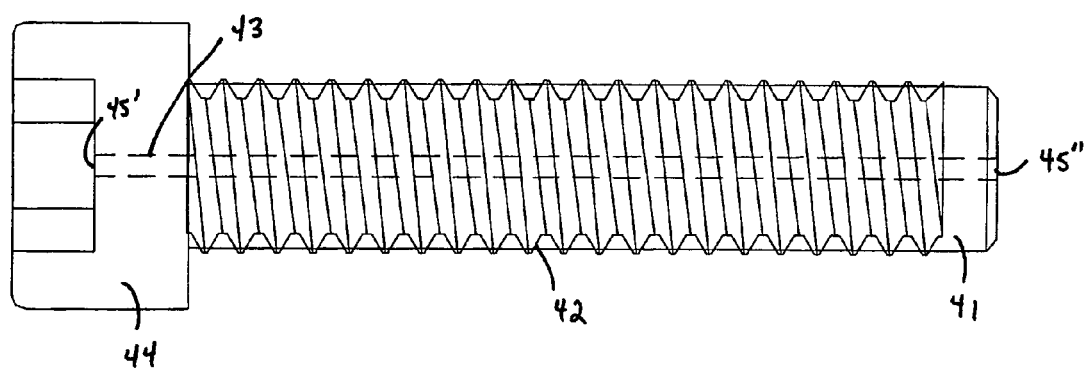
FIG. 3 is a is a schematic view of yet another embodiment of a lubricant vapor deposition apparatus according to the present invention.

Referring now to FIG. 3, shown therein, in schematic form, is plug 16 such as described above with respect to the embodiments of FIGS. 1 and 2. Plug 16 comprises head 44 and stem/body 41. Drilled hole 43 extends substantially the length of the interior of plug 16, with openings 45' and 45". Opening 45" faces the interior of the lubricant vapor source 13, which contains the liquid lubricant. Opening 45' at the opposite end of plug 16, faces the interior space 25 of deposition chamber 21. Thus, a stream of lubricant vapor passes through opening 45' and is deposited onto at least one surface of substrate 7.

The plug stem/body 41 comprises threads 42 which allow for the insertion of plug 16 into a threaded hole (not depicted) of the lubricant vapor source 13.

A plurality of plugs 16 provide for an even distribution of lubricant vapor. The lubricant vapor source 13 comprises at least a plurality of threaded holes into which plugs 16 are screwed therein. Each of the plugs comprises a drilled hole 43 which extends substantially the length of the interior of plug 16. Moreover, the drilled hole 43 of each plug 16 can have substantially the same or different diameter from the remaining plugs. In certain embodiments, a vapor flow profile can be established with varying sizes of the drilled hole in each plug to guarantee an even distribution of lubricant vapor. The larger diameter drilled holes will have a faster rate of vapor deposition than a smaller drilled hole. As an example, smaller holes can be positioned at the outer edges of the lubricant vapor source 13, with larger holes positioned towards the middle sections of the lubricant vapor source 13. Such positioning helps prevent any potential buildup of vapor deposition near the edges of the disk-shaped substrate, and thereby ensures an even distribution of lubricant vapor on each side of the disk-shaped substrate. The plugs 16 can be formed into a pattern such as a linear array, a diagonal array, or a rectangular array, however, any pattern is suitable as long as the lubricant thickness uniformity is maintained. The threaded design of the plug 16 facilitates the replacement of the plugs into the lubricant vapor source 13.

The present invention thus provides a number of advantages over conventional static vapor deposition apparatus and methodology, and is of particular utility in automated manufacturing processing of thin film magnetic and MO recording media requiring deposition of uniform thickness lubricant topcoat layers for obtaining improved tribological properties. Specifically, the present invention provides for lubricant deposition in a solventless manner not requiring pre-fractionation processing, with excellent film thickness uniformity and high bonded lube ratios. Further, the inventive apparatus and methodology can be readily utilized as part of conventional manufacturing apparatus/technology in view of their full compatibility with all other aspects of automated manufacture of magnetic and MO media. Finally, the inventive apparatus and methodology are broadly applicable to a variety of vapor deposition processes utilized in the manufacture of a number of different products, e.g., mechanical parts, gears, linkages, etc., requiring lubrication.

In the previous description, numerous specific details are set forth, such as specific materials, structures, processes, etc., in order to provide a better understanding of the present invention. However, the present invention can be practiced without resorting to the details specifically set forth. In other instances, well-known processing materials, structures, and techniques have not been described in detail in order not to unnecessarily obscure the present invention.

Only the preferred embodiments of the present invention and but a few examples of its versatility are shown and described in the present invention. It is to be understood that the present invention is capable of use in various other embodiments and is susceptible of changes and/or modifications within the scope of the inventive concept as expressed herein.

What is claimed is:

1. An apparatus comprising:
    a heated elongated lubricant source for transporting lubricant fluid to be thermally vaporized, wherein the heated elongated lubricant source comprises a chamber and a plurality of primary plugs, wherein each primary plug of the plurality of primary plugs comprises a drilled hole and two openings, and wherein a first opening of the two openings is operable to transport the lubricant fluid from the heated elongated lubricant source to a second opening of the two openings, wherein the lubricant fluid is in vaporized formed at the second opening for being dispensed over a substrate of a recording media; and
    wherein the heated elongated lubricant source comprises a plurality of threaded holes into which the plurality of primary plugs is screwed therein.

2. The apparatus according to claim 1, further comprising a deposition chamber having an interior space, wherein the deposition chamber is adapted for maintaining the interior space at a pressure ranging from $10^{-5}$ to $10^{-9}$ Torr.

3. The apparatus according to claim 1 further comprising a substrate loader/unloader operable to provide cooling/condensation of the lubricant vapor, wherein the cooling/condensation substantially prevents the lubricant vapor from escaping an interior space of a deposition chamber.

4. The apparatus according to claim 3, wherein the substrate loader/unloader is further operable to supply and withdraw the substrate of the recording media having a pair of opposed surfaces, and wherein the substrate loader/unloader is further operable to mount and grip the substrate of the recording media.

5. The apparatus according to claim 4, wherein the heated elongated lubricant source has a length greater than an outer diameter of the substrate that is disc-shaped.

6. The apparatus according to claim 1, wherein a size of a drill hole of a first primary plug of the plurality of primary plugs is different from a size of a drill hole of a second primary plug of the plurality of primary plugs for substantially even distribution of the lubricant vapor onto the substrate of the recording media.

7. The apparatus according to claim 6, wherein the heated elongated lubricant source further comprises a plurality of secondary plugs for increased collimation of the stream of lubricant vapor, wherein the plurality of secondary plugs is offset from the plurality of primary plugs.

8. The apparatus according to claim 6 further comprising a second heated elongated lubricant source that is positioned at a given distance apart from the elongated lubricant source on a path of a transport/conveyance for continuously moving one or more recording media.

9. The apparatus according to claim 1 further comprising:
    a closed heated deposition chamber cylindrically-shaped with circularly-shaped upper and lower ends;
    a substrate loader/unloader comprising at least one combined substrate load/unload station on one of the upper or lower ends; and
    a substrate transporter/conveyor operable to move the substrate of the recording media in a circular path, wherein apparatus comprises a second heated elongated lubricant source, and wherein the substrate transporter/conveyor is operable to move the substrate of the recording media past the heated elongated lubricant source and past the second heated elongated lubricant source.

10. The apparatus according to claim 9, wherein the heated elongated lubricant source is positioned at a first surface of the substrate of the recording media and the second heated elongated lubricant source is positioned at a second surface of the substrate of the recording media.

11. The apparatus according to claim 1 further comprising:
    an elongated, rectangular box-shaped chamber having a pair of longitudinally extending front and rear walls;
    a substrate loader/unloader comprising a substrate load lock chamber connected to the elongated, rectangular box-shaped chamber at a first end of the front wall and a substrate exit lock chamber connected to the elongated, rectangular box-shaped chamber at a second end of the front wall;

and a substrate transporter/conveyor operable to move the substrate of the recording media in a linear path, wherein the heated lubricant source further comprises a plurality of transversely extending, elongated lubricant sources that extend transversely across the front wall in a space between the load lock chamber and the exit lock chamber, and wherein the substrate transporter/conveyor is further operable to move the substrate of the recording media past each of the transversely extending, elongated lubricant sources.

12. The apparatus according to claim 1, wherein the plurality of primary plugs forms a linear array, a diagonal array, or a rectangular array pattern.

13. The apparatus according to claim 1, wherein a first set of primary plugs of the plurality of primary plugs positioned at the outer edges of the heated lubricant source has a smaller diameter drilled hole than a second set of primary plugs of the plurality of primary plugs positioned adjacent to the middle of the heated lubricant source for substantially even distribution of the lubricant vapor onto the substrate of the recording media.

14. The apparatus according to claim 1, wherein the plurality of primary plugs dispenses the lubricant vapor homogenously over the substrate of the recording media to form a substantially uniform thickness of the lubricant over the substrate.

15. The apparatus according to claim 1, wherein a rate of the lubricant vapor deposition is controlled by a rate of a speed that the substrate of the recording media is passed along the heated elongated lubricant source.

16. The apparatus according to claim 1, wherein a rate of the lubricant vapor deposition is controlled by varying a pressure of the lubricant vapor deposition.

17. The apparatus according to claim 1, wherein a rate of the lubricant vapor deposition is controlled by a size of a drill hole associated with a primary plug of the plurality of primary plugs.

* * * * *